(12) United States Patent
Raichlen

(10) Patent No.: US 7,008,077 B2
(45) Date of Patent: Mar. 7, 2006

(54) LIGHTED BARBECUE TONGS

(75) Inventor: Steven Raichlen, Coconut Grove, FL (US)

(73) Assignee: Planet Barbecue, Inc., Coconut Grove, FL (US)

( * ) Notice: Subject to any disclaimer, the term of this patent is extended or adjusted under 35 U.S.C. 154(b) by 149 days.

(21) Appl. No.: 10/765,946

(22) Filed: Jan. 29, 2004

(65) Prior Publication Data
US 2005/0168972 A1 Aug. 4, 2005

(51) Int. Cl.
B25B 23/18 (2006.01)
(52) U.S. Cl. .............. 362/120; 362/119; 362/191; 362/253; 294/3; 294/16
(58) Field of Classification Search .............. 362/109, 362/119, 234, 253, 190, 191, 120; 294/3, 294/16; 30/142
See application file for complete search history.

(56) References Cited

U.S. PATENT DOCUMENTS

| 2,666,843 | A |  | 1/1954 | Zuckerman |
| 3,370,163 | A |  | 2/1968 | Brill |
| 3,510,643 | A |  | 5/1970 | File |
| 4,896,253 | A |  | 1/1990 | Southworth |
| 5,023,761 | A |  | 6/1991 | de Lange |
| 5,036,442 | A |  | 7/1991 | Brown |
| 5,313,376 | A |  | 5/1994 | McIntosh |
| 5,568,698 | A |  | 10/1996 | Harding et al. |
| 5,921,654 | A |  | 7/1999 | Coyle |
| 5,964,517 | A | * | 10/1999 | Adams ................. 362/119 |
| 6,296,365 | B1 |  | 10/2001 | McCalla et al. |
| 6,419,371 | B1 |  | 7/2002 | McCalla |
| 6,675,483 | B1 | * | 1/2004 | Bond et al. .............. 30/142 |
| 6,726,263 | B1 | * | 4/2004 | Wang et al. ............. 294/16 |

* cited by examiner

Primary Examiner—Stephen F Husar
(74) Attorney, Agent, or Firm—Fish & Richardson P.C.

(57) ABSTRACT

A lighted barbecue tong allowing a person who is grilling outdoors to see at night comprising a tongs having an elongated handle portion comprising interconnected rolled steel arms and heat proof grips mounted on the arms. Each arm ends in a flared scalloped end and a switch activated flashlight is mounted in a clip assembly mounted on the elongated handle portion of the barbecue tong.

25 Claims, 3 Drawing Sheets

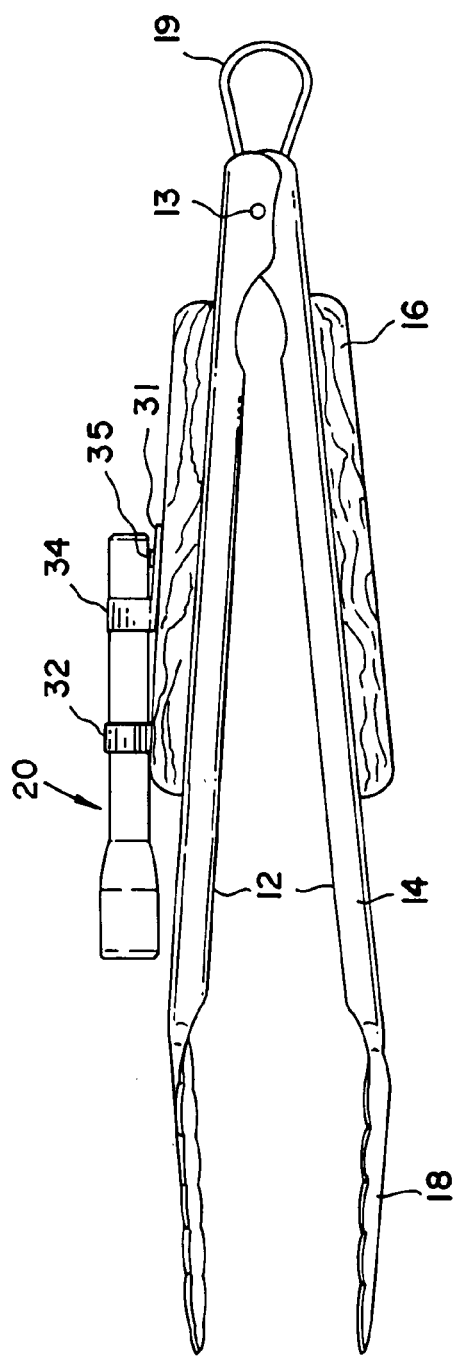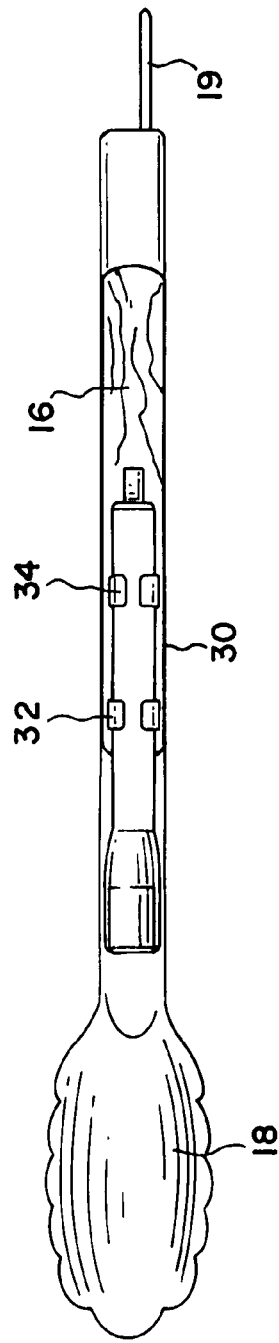

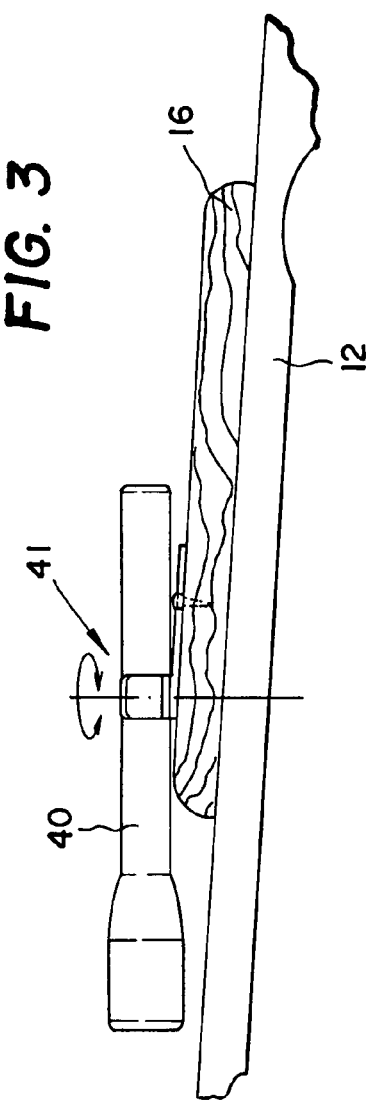
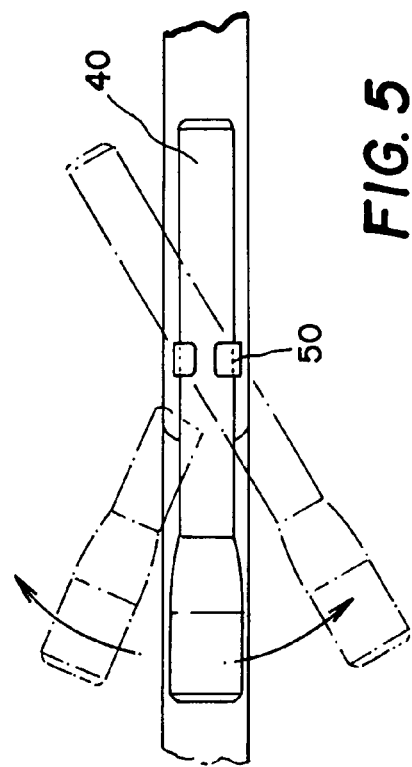
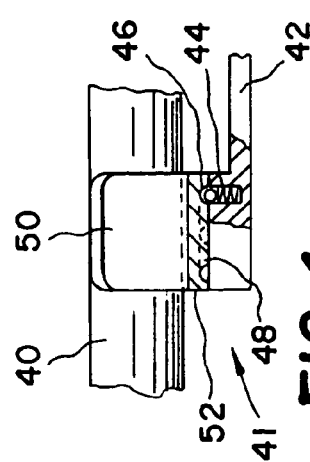

LIGHTED BARBECUE TONGS

RELATED APPLICATIONS

There are no related applications.

BACKGROUND OF THE INVENTION

1. Field of the Invention

The present invention generally relates to outdoor cooking equipment and, more particularly, is directed toward a lighted cooking barbecue tongs.

2. Description of the Prior Art

Barbecues are a tradition enjoyed by groups and families throughout the United States throughout the year and a high number of households own outdoor grills.

Barbecues typically take place in late afternoon or evening around the time when an evening meal is normally served. Since barbecuing is conducted outdoors with the activity continuing after dusk, lighting must be provided to illuminate the area where the grill is located. Floodlights, flashlights and the like are used to provide general illumination of the area.

These prior art practices, while providing general lighting of the patio area, fail to adequately illuminate the food itself as it is being barbecued on the grill. Thus, the sense of sight that is crucial to monitoring and controlling any cooking task is typically hindered in outdoors barbecuing because of inadequate lighting, with the result that the success or failure of the barbecue is often left to chance. As a result, the person performing the barbecuing task has to do a lot of guessing as to whether or not the food, typically meat, has been cooked the desired degree with the resultant effect on taste and appearance.

Consequently, a need exists for an easy and convenient way in which to illuminate the food while it is being barbecued without requiring the use of electrical cords and expensive outdoor lighting fixtures.

A number of devices have been used to attempt to solve this problem. U.S. Pat. No. 5,023,761 issued Jun. 11, 1991 discloses a lighted cooking fork having an elongated hand grip and a hollow interior cavity for receiving and supporting an electric battery and a hand switch to activate electrical energy to a light bulb mounted in a light socket. The holder accessory also has a utensil socket and a light socket disposed in a collar mounted at a forward end of the hand grip. The utensil socket is mounted offset to the bottom of the hand grip and forward of the light socket for receiving and mounting a coupling end of a shaft of a designated cooking utensil which can be a fork, spatula, knife, or brush. The light socket is mounted about the longitudinal axis of the hand grip and positions the light bulb to direct a beam of light along the longitudinal axis of the hand grip and toward the working end of the utensil so as to illuminate the food at the working end of the utensil.

Another U.S. Pat. No. 5,964,517 issued on Oct. 12, 1999 is directed to a lighted barbecue tool for allowing a person who is grilling outdoors to see at night. The device includes a barbecue implement having an elongated handle portion and a food handling portion. A removable pressure activated light source is mounted to the elongated handle portion of the barbecue tool as seen in FIGS. 3 and 4. A constant pressure is placed on the switch to maintain illumination. It is noted in the patent specification that other barbecue tools can be used such as a spatula, tongs and brush.

Another U.S. Pat. No. 4,896,253 issued Jan. 23, 1990 is directed to a mechanically motorized portable skewer/flashlight assembly comprising a housing and a flashlight structure carried by the housing which serves as a handle for the skewer. The assembly also includes a motor driven telescopic rod and a food-receiving tip. The motor may have an audio source of advertising and/or music.

Other known prior art for illuminated tools include U.S. Pat. No. 2,666,843 issued Jan. 19, 1954; U.S. Pat. No. 3,370,163 issued Feb. 20, 1968; U.S. Pat. No. 3,510,643 issued May 5, 1970; U.S. Pat. No. 5,313,376 issued May 17, 1994; U.S. Pat. No. 5,568,698 issued Oct. 19, 1996; U.S. Pat. No. 5,727,319 issued Mar. 17, 1998; U.S. Pat. No. 5,921,654 issued Jul. 13, 1999; U.S. Pat. No. 6,099,138 issued Aug. 8, 2000; U.S. Pat. No. 6,296,365 issued Oct. 2, 2001 and U.S. Pat. No. 6,419,371 issued Jul. 16, 2002.

SUMMARY OF THE INVENTION

The present invention is directed toward lighted barbecue tongs having a detachable flashlight and clip mechanism so that the flashlight can be easily unclipped from the tongs to aid in cleaning. The tongs are of a length to protect the user from being burned, have flared scalloped metal edges for easily grabbing food, heat proof grips on the sides and connected proximal ends with a locking mechanism which can limit the expansion of the tongs.

It is an object of the invention to provide barbecue tongs with an easily removable, mounted flashlight for illumination of the barbecuing area.

It is another object of the invention to provide barbecue tongs which can easily be cleaned in a dishwasher.

It is still another object of the invention to have barbecue tongs of a length that one can handle food cooking on an open grill without burning the user's hand or arms.

It is yet another object of the invention to have barbecue tongs with heat proof grips on the sides.

It is another object of the invention to have barbecue tongs which have a source of illumination which can easily be switched on and off and which can easily be removed from the tongs.

These and other objects, advantages, and novel features of the present invention will become apparent when considered with the teachings contained in the detailed disclosure which along with the accompanying drawings constitute a part of this specification and illustrate embodiments of the invention which together with the description serve to explain the principles of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the lighted barbecue tongs according to the present invention;

FIG. 2 is a top plan view of the barbecue tongs shown in FIG. 1;

FIG. 3 is a partial side elevation view of a rotatable clip embodiment for the flashlight of the present invention;

FIG. 4 is an enlarged side elevation and partial sectional view of the rotatable clip of FIG. 3;

FIG. 5 is a top plan view of the rotatable clip in FIG. 3 showing rotatable positions of the flashlight in phantom;

DETAILED DESCRIPTION OF THE INVENTION

Figure 6:
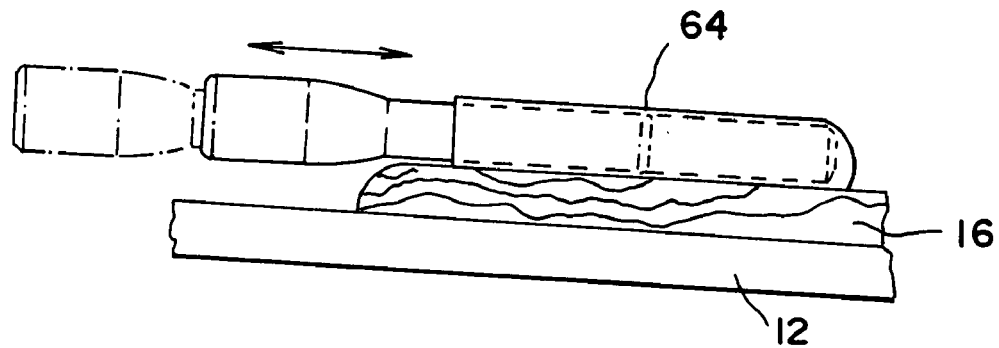
FIG. 6 is a side elevational view of a sleeve holder for the flashlight, showing sequential insertion of the flashlight in phantom.

The preferred embodiment and best mode of the invention is shown in FIGS. 1 through 2. While the invention is described in connection with certain preferred embodiments, it is not intended that the present invention be so limited. On the contrary, it is intended to cover all alternatives, modifications, and equivalent arrangements as may be included within the spirit and scope of the invention as defined by the appended claims.

With reference now to the drawings, and in particular to FIGS. 1 through 2 thereof, a new lighted barbecue tongs embodying the principles and concepts of the present invention and generally designated by the reference numeral 10 is described.

The lighted barbecue tongs 10 has rolled steel arms 12 having their proximal ends interconnected by a pivot fastener 13. The arms 12 have an elongated portion 14 with heat proof handles or grips 16 mounted thereto with fasteners or adhesive and a food handling distal end in the form of flared scalloped metal ends 18 for easily grabbing and holding the food for turning or placement. The heat proof grips 16 can be constructed of wood or heat proof plastic with a knurled surface to promote better griping. The preferred length of the tongs is 16 to 24 inches so that the user can handle food without burning an arm or hand. The rolled steel arms 12 allow the tongs to handle heavy objects such as chickens or roasts without the tongs buckling and are spring biased away from each other. The arms 12 are hinged or pivoted at their proximal ends and can be locked in a fixed position with a slideable lock member 19.

A selectively activated light source assembly 20 in the form of a flashlight 40 is adapted to be removably mounted on the elongated handle portion 14 preferably on grips 16. If desired, the light source assembly 20 can be mounted on the rolled steel arms 12. The light source assembly 20 is in the form of a snap on holder clip 30 preferably constructed of metal which is mounted on the grip 16. The holder clip 30 has a base 31, which can have a curved cross section or configuration which allows seating on the grip 16, a front spring clip 32 and a rear spring clip 34 which are secured to the base 31. The arms of the clips are forced open by the camming action of a battery powered flashlight 40 which is pressed against the open clip arms and held in place by the spring action of curved arms of the clips 32 and 34. The base 31 is shown as being fastened to grip 16 by a screw 35. However, other fasteners such as rivets, magnets or adhesive can be used. It is also envisioned that two flashlights can be mounted on the tongs, one on each side of the tongs under the handle or grips. Alternately the flashlight can be mounted in the center of the tongs beneath the hinge or outside the hinge so that it shines down inside the tongs.

Alternatively, the clip can be constructed to rotate as shown in FIGS. 3 through 5. In this embodiment, the clip assembly 41 has a base member 42 with a plurality of spring biased bearings 44 which snap fit into recesses 46 formed in bottom of the arm support member 52. The clip arms 50 and arm support bottom member 52 can be rotatably mounted to base member 42 by a post (not shown) allowing the clip and flashlight to swivel on the post to a desired fixed angular position in respect to the axis of the arm 12 as shown in FIG. 5.

In the embodiment shown in FIG. 6, the flashlight 40 is mounted in a sleeve or tube 60 preferably rigid which is adhesively secured to grip 16 or fastened to the grip by clips or fasteners. The tube 60 can be provided with a rear aperture 62 or a top aperture 64 to expose the switch of the flashlight allowing the flashlight to be switched on and off.

Figure 7:
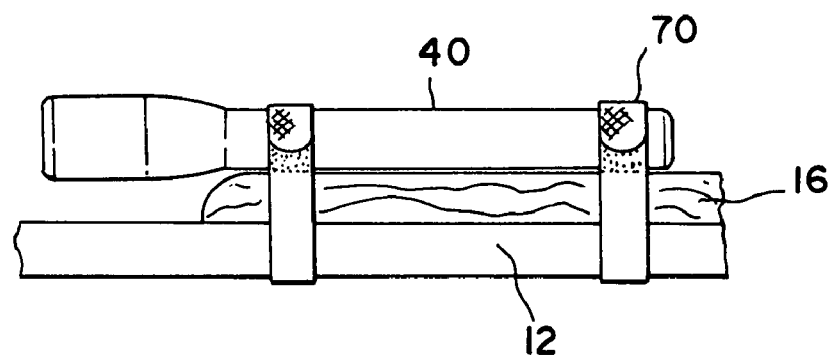
FIG. 7 is a side elevational view of a hook and loop fastener strip holding the flashlight on the tongs.

In the embodiment shown in FIG. 7, the flashlight 40 is held on grip 16 by a hook and loop fastener type strap 70 such as VELCRO® which is secured to the grip 16 or arm 12 by adhesive or fasteners.

Figure 8:
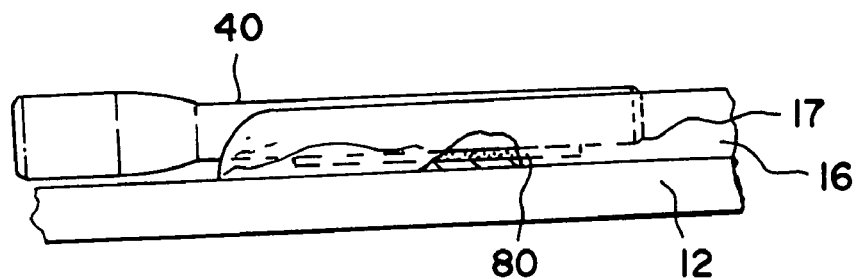
FIG. 8 is a side elevational view of a magnetic strip holding the flashlight on the tongs.

In the embodiment shown in FIG. 8, the flashlight 40 is seated in a groove or channel 17 formed in the grip 16 and is seated on a magnetic strip 80 positioned on the bottom of the groove 17. The flashlight can be constructed with another magnetic strip or the channel can be cut through the grip 16 to the rolled steel arm 12 and the magnetic strip 80 secured to the flashlight by adhesive. The magnetic forces of magnet on magnet or magnet on steel hold the flashlight in place. If desired, two strips of hook and loop fastener means such as VELCRO® could be substituted for the magnetic strip.

The flashlight holder allows for quick and easy removal of the flashlight 40 so that the flashlight can be removed before placing the tongs in a dishwasher. If the flashlight were left on the tongs, the flashlight would, even if it were water proof, in time be disabled by the heat of the dishwasher and corrosive action of the dishwasher detergent.

The battery powered flashlight 40 has a detachable rear portion allowing the insertion of AA or AAA batteries (not shown) to power the same and the lamp has a wide beam allowing full illumination of the area. A switch is mounted on the side or end of the flashlight 40 to turn the lamp on as is well known in the art and leave it on during cooking and then to be switched off when the light is no longer necessary. A locking mechanism 19 is mounted on the closed pivot end of the arms 12 and is slid over the ends of the arm to lock the tongs in a fixed position for storage of if the user wants a limited area of expansion for the tongs.

In use, while a person is barbecuing at night, they will switch on the light source to produce a beam of light from the lamp that will be directed towards the grill area to allow the person to better visualize the food that they are grilling. After the cooking has been completed, the flashlight is switched off, the flashlight is removed from the clip or holder and the tongs are placed in a dishwasher to be cleaned.

With respect to the above description then, it is to be realized that the optimum dimensional relationships for the parts of the invention, to include variations in materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What I claim is:

1. Barbecue tongs comprising:
   a barbecue implement having an elongated arms with flared ends, a heat proof grip mounted on each of said arms; and
   a light source comprising at least one flashlight detachably coupled to clip means mounted on the elongated arms of the barbecue implement.

2. Barbecue tongs as claimed in claim 1 wherein said flared ends are scalloped metal edges.

3. Barbecue tongs as claimed in claim 1 wherein said heat proof grips have a knurled surface.

4. Barbecue tongs as claimed in claim 1 wherein said tongs have a length which ranges from 16 inches to 24 inches.

5. Barbecue tongs as claimed in claim 1 wherein said arms are rolled steel.

6. Barbecue tongs as claimed in claim 1 wherein said a locking mechanism is mounted at the proximal end of said tongs.

7. Barbecue tongs as claimed in claim 1 wherein said clip means comprises a base and an open face clip member rotatably mounted on said base.

8. Barbecue tongs as claimed in claim 1 wherein said clip means is a sleeve mounted to said heat proof grip.

9. Barbecue tongs as claimed in claim 1 wherein said clip means is at least one hook and loop fastener strip.

10. Barbecue tongs as claimed in claim 1 wherein said clip means comprises a base member, fastening means on said base to allow same to be fastened to said tongs and a plurality of open faced spring clips mounted to said base member.

11. Barbecue tongs as claimed in claim 10 wherein said fastening means is a tongue and groove assembly.

12. Barbecue tongs as claimed in claim 10 wherein said fastening means is at least one spring clip.

13. Barbecue tongs as claimed in claim 10 wherein said fastening means is a post and spring detent assembly.

14. Barbecue tongs as claimed in claim 8 wherein said fastening means is a hook and loop fastener strip mounted on said base which engages a hook and loop fastener strip member mounted to said grip.

15. Barbecue tongs for allowing a person who is grilling outdoors to see at night comprising, in combination:
    a barbecue implement having an elongated handle portion comprising interconnected arms which are spring biased from each other and heat proof grips mounted on each of said arms and a food handling end comprising a flared scalloped metal edges;
    a switch activated portable light source in the form of a flashlight adapted removably mounted to the elongated handle portion of the barbecue implement with clip means, said clip means comprising a base member, fastening means secured to said base member fastening said base member to said elongated handle portion and at least one open clip mounted to said base member to engage and hold said flashlight.

16. Barbecue tongs as claimed in claim 15 wherein said light source comprises a plurality of flashlights.

17. Barbecue tongs as claimed in claim 15 wherein said fastening means is a magnetic strip.

18. Barbecue tongs as claimed in claim 15 wherein said fastening means is at least one spring clip.

19. Barbecue tongs as claimed in claim 15 wherein said fastening means is a post and spring detent assembly.

20. Barbecue tongs as claimed in claim 15 wherein said fastening means is at least one hook and loop fastener strip.

21. Barbecue tongs for allowing a person who is grilling outdoors to see at night comprising, in combination:
    a barbecue implement having an elongated handle portion comprising arms which are pivotally mounted to each other and heat proof grips mounted on each of said arms, the distal end of each arm formed as a flared scalloped end;
    a switch activated portable light source in the form of a flashlight adapted to be removably mounted to the elongated handle portion of the barbecue implement with clip means, said clip means comprising a base member, fastening means secured to said base member fastening said base member to said elongated handle portion and at least one open spring clip mounted to said base member to engage and hold said flashlight.

22. Barbecue tongs as claimed in claim 21 wherein said at least one open spring clip comprises a support which defines recesses mounted adjacent said base member, said base member having spring detent means mounted therein which engage said support recesses allowing said clip means to be selectively rotated to a plurality of positions and held in place in a selected position.

23. Barbecue tongs as claimed in claim 21 wherein said open spring clip is mounted to said base member through a post member extending from said base member.

24. Barbecue tongs for allowing a person who is grilling outdoors to see at night comprising, in combination:
    a barbecue implement having an elongated handle portion comprising arms which are pivotally mounted to each other and heat proof grips mounted on each of said arms, the distal end of each arm formed as a flared scalloped end;
    a switch activated portable light source in the form of a flashlight adapted to be removably mounted to the elongated handle portion of the barbecue implement with sleeve means secured to one of said grips.

25. Barbecue tongs as claimed in claim 24 wherein said sleeve means is a rigid tube with at least one aperture defined therein.

* * * * *